US 6,322,023 B1

(12) United States Patent
Soranno et al.

(10) Patent No.: US 6,322,023 B1
(45) Date of Patent: *Nov. 27, 2001

(54) EVOLVABLE PROPULSION MODULE

(75) Inventors: Kevin A. Soranno, Redondo Beach; David L. Younkin, Los Alamitos, both of CA (US)

(73) Assignee: TRW Inc., Redondo Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/635,607

(22) Filed: Aug. 10, 2000

Related U.S. Application Data

(63) Continuation of application No. 09/053,178, filed on Apr. 1, 1998, now Pat. No. 6,193,193.

(51) Int. Cl.[7] .................................................. B64G 1/00
(52) U.S. Cl. ........................................ 244/159; 244/161
(58) Field of Search .............................. 244/159, 158 R, 244/161, 172

(56) References Cited

U.S. PATENT DOCUMENTS

| | | | |
|---|---|---|---|
| 2,396,039 | * | 3/1946 | Burton et al. . |
| 4,288,051 | * | 9/1981 | Goschel .............................. 244/169 |
| 4,880,187 | | 11/1989 | Rourke et al. . |

OTHER PUBLICATIONS

Ress, R., Koopmann, H. J., "The Automated Transfer Vehicle ATV—Baseline ISS Servicing Missions and Potential Future Applicants", 47th International Astronautical Congress, Oct. 7–11, 1996.

Debas, G., "Automated Transfer Vehicle—Status and Evolutions", 45th Congress of the International Astronautical Federation, Oct. 9, 1994.

Clark, P. S., Gibbons, R. F., "The Evolution of the Soyuz Programme", Journal of the British Interplanetary Society, vol. 36, No. 10, Oct. 1983, pp. 434–452.

Lenorovitz, J. M. "Russia to Expand Role in Manned Space Flight", Aviation Week and Space Technology, vol. 139, No. 5, Aug. 2, 1993, pp. 62–63.

* cited by examiner

Primary Examiner—Charles T. Jordan
Assistant Examiner—Tien Dinh
(74) Attorney, Agent, or Firm—Harness, Dickey & Pierce, P.L.C.

(57) ABSTRACT

A spacecraft propulsion module (16) that includes an outer cylindrical housing (20), an end wall (22) and a specialized internal structure (50) that is capable of supporting various spacecraft components (110, 112, 124), to provide different levels of spacecraft complexity for different missions. The internal structure (50) within the housing (20) includes a plurality of inner walls (52–58) defining an "eggcrate" structure. The plurality of inner walls (52–58) includes a first pair of walls (52, 54), extending in one direction and a second pair of walls (56, 58) extending in a substantially orthogonal direction to define a center compartment (76) surrounded by a plurality of perimeter compartments (60–74). The inner walls (52–58) and the outer housing (20) define support surfaces on which can be mounted different spacecraft components, such as propellant tanks (110), pressurant tanks (168), life support tanks (126), control, guidance, navigation and communication avionics (124), batteries (112), etc. depending on the particular spacecraft design. The outer surface of the cylinder housing (20) and end wall (22) provide a significant amount of surface area for mounting engines (36) and thrusters (38) to give the module (16) free flying capability for both four and six degrees of freedom. The intersection of the inner walls (52–58) gives the spacecraft module (16) four inner mounting points (80–86) and the intersection of the inner walls (52–58) with the outer housing (20) gives the spacecraft eight outer mounting points (88–102). These mounting points (80–102) gives the spacecraft module versatility to attach different types of mounting adapters (42, 44, 46, 164) to connect other spacecraft modules to the propulsion module (16), such as crew modules, cargo modules, equipment modules, additional propulsion modules, etc.

36 Claims, 10 Drawing Sheets

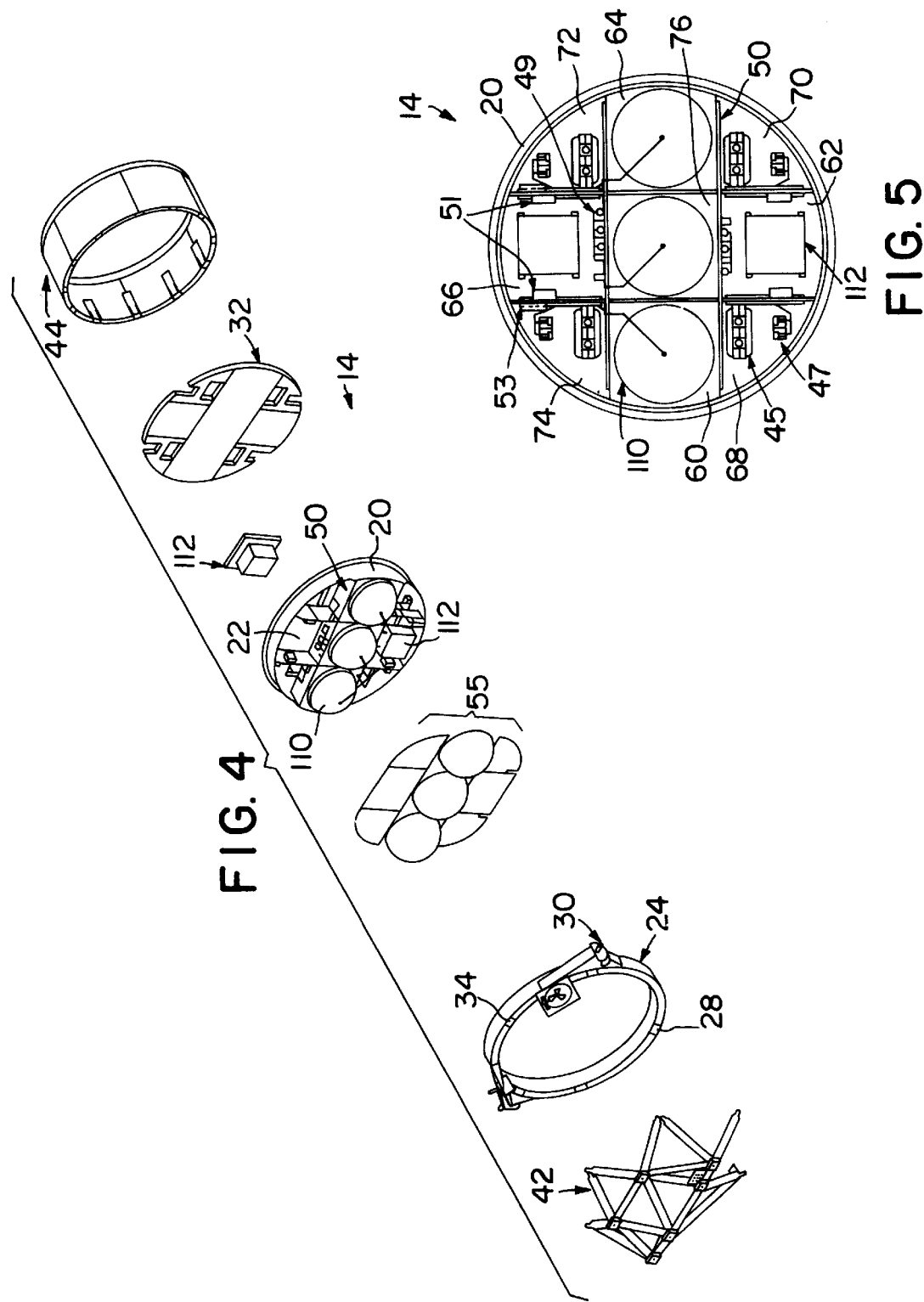

EVOLVABLE PROPULSION MODULE

This Application is a con. of Ser. No. 09/053,178 filed Apr. 1, 1998 now U.S. Pat. No. 6,193,193.

BACKGROUND OF THE INVENTION

1. Field of the Invention

This invention relates generally to a spacecraft module including an internal "eggcrate" structural layout, and a method of converting a spacecraft deorbit propulsion module to more complex spacecraft modules to be used in connection with various types of space vehicles for different missions, such as a crew return vehicle, a crew transport vehicle, a refueling tanker, a logistics re-supply module, a space station reboost module, etc.

2. Discussion of the Related Art

Spacecraft and their associated propulsion stages are typically designed for a single use and for performing a single type of space mission. Thus, the design of the spacecraft, including the size, shape, payload, avionics equipment, propulsion capacity, and electrical power storage and regeneration capacity, are tailored for the intended space mission without concern for satisfying any other mission or operational requirements. For example, the known Centaur upper stage is designed to have a certain propulsive capability for a certain class of missions and a certain class of payloads. Its ability to be adapted to other types of missions for different classes of payloads once it is designed is very limited. The advantage in this type of approach is that the spacecraft is designed to be the most efficient and least expensive way to meet the requirements for a particular mission. Accordingly, providing for different types of space missions has generally required independent design and assembly of entirely different types of space vehicles, each designed for performing its own specific space mission. This overall approach is both extremely costly and time consuming in the long run to satisfy all types of missions.

It has been proposed in the art to design a multi-mission modular spacecraft that can be used for multiple mission types to help reduce the costs involved in multiple mission space programs. U.S. Pat. No. 4,880,187 issued to Rourke et al., and assigned to the assignee of the instant application, attempts to satisfy the need for a multiple spacecraft that can be adapted to different mission requirements. The '187 patent discloses a multipurpose modular spacecraft that includes a fully integrated short-range space vehicle designed to accept and interface with one or more self-contained modular propulsion units of different sizes and different propulsion capacities in accordance with the requirements of a particular space mission. The short-range vehicle includes a relatively large open-sided chamber in the rear axial face of the vehicle that accepts a long-term propulsion module. Therefore, the short-term modular propulsion units can be readily removed, and the long-term propulsion module can be inserted for longer space missions.

The multipurpose modular spacecraft disclosed in the '187 patent does satisfy a need for a single spacecraft that is usable for different mission types. However, the multipurpose spacecraft is initially designed for both short-term and long-term missions, and thus includes the capacity for both types of missions at the lowest design level. Because it is initially designed to meet several types of mission requirements, the modular spacecraft of this invention is relatively complex and costly to implement, even for low-end space missions.

The need for multiple types of space missions having different requirements is apparent from the requirements necessary to operate a space station. Several countries are currently collaborating on the design, development, deployment and maintenance of an international space station (ISS). One purpose of the multigovernment involvement in development of the ISS is to better account for the extreme costs involved in such a project. Different countries have been assigned different aspects of the ISS to develop the finished product. Some of the different spacecrafts required for the operation of the ISS includes a crew return vehicle (CRV), which is an emergency life boat for crew members currently stationed on the ISS. A deorbit propulsion module (DPM) having four degrees of freedom is necessary for on-orbit attitude control and deorbit impulses required to bring the CRV back to Earth from the ISS. The DPM derived vehicle can also provide reboost and attitude control of the ISS to maintain a desired orbit. Additionally, a crew transport vehicle (CTV) is required for transporting crew members to the ISS and back to Earth for crew rotation. The CTV requires a propulsion module having six degrees of freedom. Additionally, a logistics resupply vehicle (LRV) is required for unmanned delivery of cargo and other payload to the ISS. A refueling tanker is also necessary to supply fuel to the ISS when needed. Both the LRV and the refueling tanker would require a propulsion module or some form of propulsive stage. Some of the space vehicles required for these missions can be launched from Earth by an expendable launch vehicle (ELV), such as the Atlas, Delta, or Ariane V, or be launched from Earth in the shuttle orbiter. Each of the various space vehicles for different missions have different requirements and mission needs.

Because of the multigovernmental involvement, the political backdrop and the economic conditions surrounding the participation of various countries is uncertain. It has been recognized by the current inventors that a basic core propulsion vehicle could be used and modified to provide the various support functions in connection with the ISS, as well as other space missions. By providing this basic core vehicle, the contributions from other countries may not need to be relied on, and the expense of the project can be limited.

There exists a need for an improved spacecraft designed for rapid, easy and safe adaptation for performing a wide variety of different space missions in a cost conscious manner. It is therefore an object of the present invention to provide an evolvable propulsion module that can be modified to provide various mission functions, such as a propulsion module for CRVs, CTVs, logistics resupply vehicles, ISS refueling and ISS reboost and attitude control.

SUMMARY OF THE INVENTION

In accordance with the teachings of the present invention, a spacecraft propulsion module is disclosed that includes an outer cylindrical housing, an end wall and a specialized internal structural layout that is capable of supporting various spacecraft components to provide different levels of spacecraft complexity for different missions. The internal structure within the housing includes a plurality of internal walls defining an "eggcrate" structure. The plurality of internal walls includes a first pair of walls extending in one direction and a second pair of walls extending in a substantially orthogonal direction to define a center compartment surrounded by a plurality of perimeter compartments. The internal walls and the outer housing define support surfaces on which can be mounted different spacecraft components, such as propellant tanks, pressurant tanks, life support tanks, control, guidance, navigation and communication avionics, batteries, etc. depending on the particular spacecraft design. The outer surface of the cylinder housing and end wall provide a significant amount of surface area for mounting engines and thrusters to give the module free flying capability for both four degrees and six degrees of freedom.

The intersection of the internal walls gives the spacecraft module four inner mounting points and the intersection of the internal walls with the outer housing gives the spacecraft eight outer mounting points. These mounting points give the spacecraft module versatility to attach different types of removable mounting adapters and interfaces to connect other spacecraft modules to the propulsion module, such as crew modules, cargo modules, equipment modules, additional propulsion modules, etc. depending on the footprint size of the module relative to the mounting points on the propulsion module.

The structural design of the spacecraft propulsion module of the invention gives it versatility to be converted into various propulsion modules suitable for different mission types. A suitable number of propellant tanks, control avionics, batteries, etc. can be mounted within the desirable compartments to give the spacecraft an evolvable, cost effective benefit to be used as propulsion modules for different space vehicles, such as CRVs, CTVs, refueling tankers, LRVs, propulsion modules for spacecraft attitude and reboost, etc.

Additional objects, advantages and features of the present invention will become apparent from the following description and appended claims, taken in conjunction with the accompanying drawings.

BRIEF DESCRIPTION OF THE DRAWINGS

FIG. 4 is an exploded perspective view of the propulsion module shown in FIG. 2;

FIG. 5 is a front plan view of a portion of the propulsion module shown in FIG. 2;

DETAILED DESCRIPTION OF THE PREFERRED EMBODIMENT

The following discussion of the preferred embodiments directed to an evolvable propulsion module, having a specialized internal structural layout, that can be readily modified to be suitable for use in connection with various space vehicles for various space missions is merely exemplary in nature, and is in no way intended to limit the invention or its applications or uses. The discussion below will be directed to various space missions required in connection with the International Space Station, but as will be appreciated by those skilled in the art, the teachings of the invention have application to a much broader range of space missions, such as interplanetary travel, scientific probes, independent orbital vehicles, etc.

Figure 1:
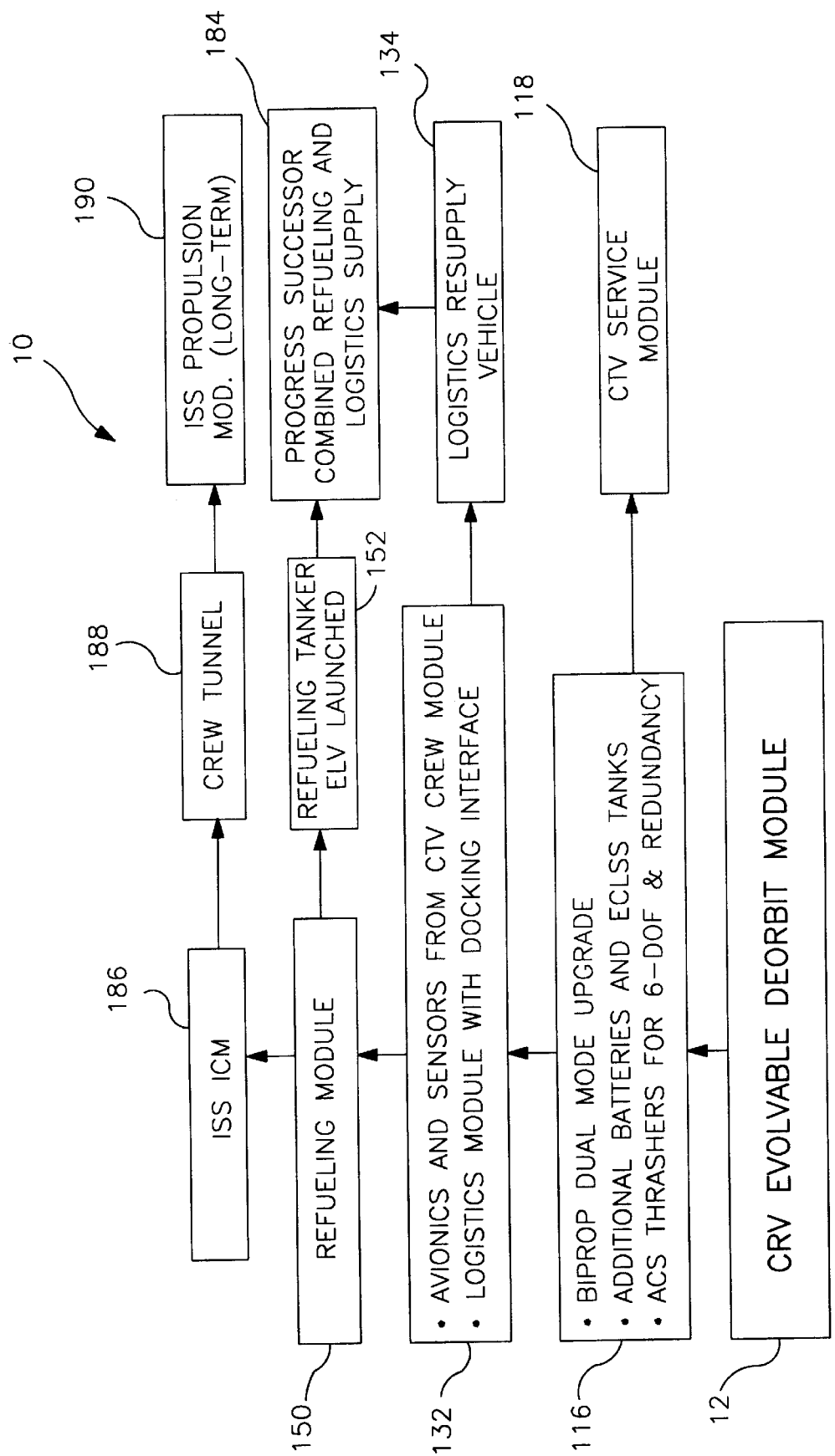
FIG. 1 is a block diagram depicting a method of evolving a deorbit propulsion module into more complex spacecraft modules for various missions and mission types, according to the invention.

The discussion below directed to an evolvable propulsion stage or propulsion module (PM), according to the invention, concerns initially developing a basic, low complexity PM suitable for deorbit maneuvers, such as would be used in connection with a CRV on a space station. The CRV includes the common functional elements of most all of the various missions in that it has the ability of target acquisition for rendezvous and docking or attitude control. The CRV would include the combination of a crew module (CM) and the PM. The CRV PM would be ejected from the CM prior to entry of the CRV into the atmosphere. The CRV can be brought to the space station by any suitable technique, such as by an ELV or the shuttle orbiter. The CRV PM is the basic building block PM because since the CRV mission is relatively short, it has the least complexity of the ISS missions. The CRV PM includes a specific spacecraft structure, discussed in detail below, that can be used to support the necessary components for more complex spacecrafts and propulsion modules for more involved space missions. Of course, the CRV PM discussed herein can be used in connection with any type vehicle or spacecraft of a similar mission. FIG. 1 is a block diagram 10 showing the steps of evolving the CRV PM, represented at box 12, into more complex spacecrafts. In the discussion below, like components are identified by the same reference number.

Figure 2:
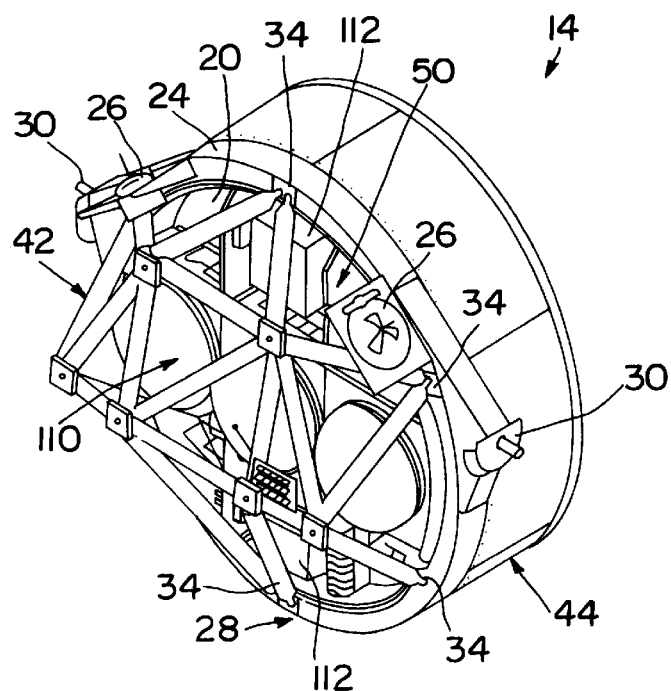
FIG. 2 is a front perspective view of a propulsion module for use in connection with a CRV, according to an embodiment of the present invention.
Figure 3:
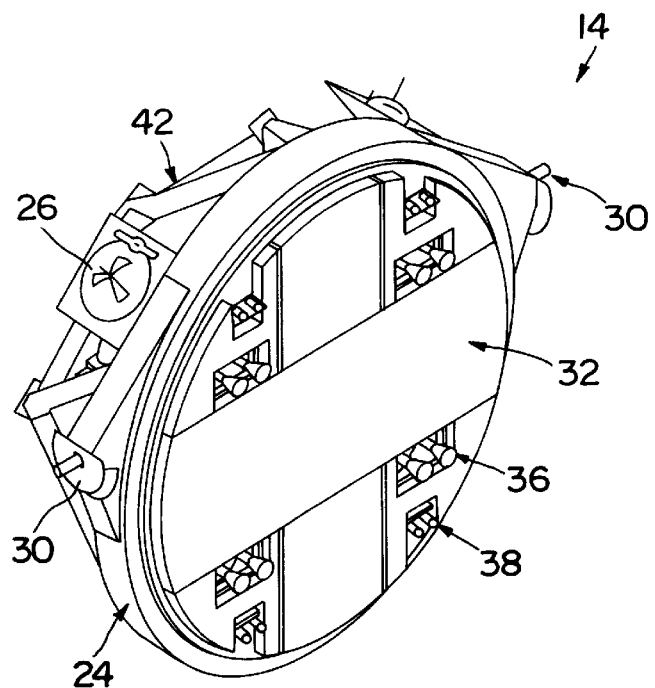
FIG. 3 is a back perspective view of the propulsion module shown in FIG. 2.
Figure 6:
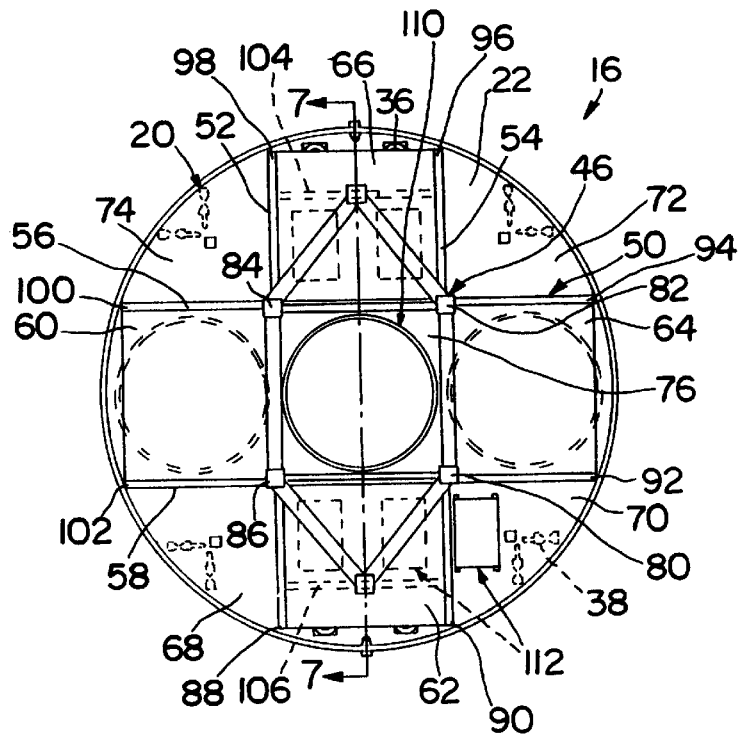
FIG. 6 is a front plan view of another propulsion module for use in connection with a CRV, according to another embodiment of the present invention.
Figure 7:
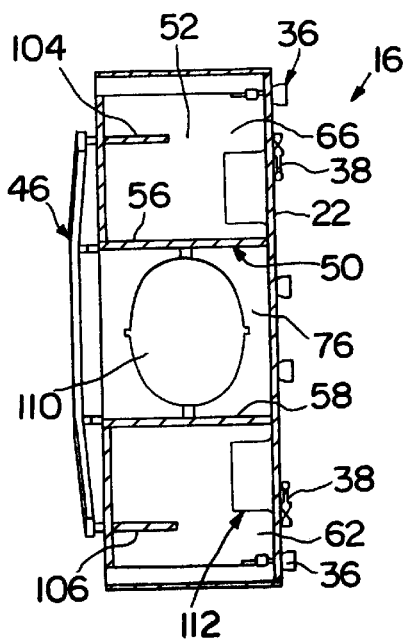
FIG. 7 is a cross-sectional view of the propulsion module shown in FIG. 6 taken through line 7—7.

FIG. 2 shows a front perspective view, FIG. 3 shows a back perspective view, and FIG. 4 shows an exploded perspective view of an evolvable PM 14, such as a CRV PM, according to an embodiment of the present invention. FIG. 6 shows a front plan view and FIG. 7 shows a cross-sectional view through line 7—7 in FIG. 6 of an evolvable CRV PM 16 that includes variations and modifications to that of the PM 14. The PMs 14 and 16 include an outer cylindrical housing 20 and an aft end panel 22 connected to an aft end of the housing 20, both made of a suitable spacecraft housing material, such as an aluminum alloy or graphite. Although not shown, an opposite end panel could also be positioned on the forward rim of the housing 20. The housing 20, the end panel 22, and opposite end panel of the PMs 14 and 16 can have any known thickness, panel structure, double wall structure, honeycomb structure, etc. in conformance with the design requirements for spacecraft integrity. In one embodiment, the diameter of the housing 20 is about 142 inches to conform with existing spacecraft dimensions. However, as will be appreciated by those skilled in the art, the outer diameter dimensions of the PMs 14 and 16 can vary from design to design.

The PM 14 is specifically adapted to be mounted to an interface ring 24 which, in turn, is mounted in a shuttle orbiter (not shown) to be transported to the ISS. The interface ring 24 is comprised of an annular structure utilizing a box beam construction having a rectangular cross section. Six mounting points 34 are provided on the forward face of interface ring 24 and are used to support a forward adapter assembly 42 in the manner described below. The interface ring 24 includes a pair of shuttle grapple interfaces 26, a shuttle keel trunnion pin 28 and a pair of shuttle longeron trunnion pins 30 mounted to the interface ring 24, as shown. The interfaces 26 are grasped by the shuttle arm to remove the PM 14 from the bay of the orbiter. The trunnion pins 28 and 30 and the interface ring 24 mount and support the PM 14 within the bay of the shuttle orbiter.

The PM 16 does not mount inside an interface ring and does not include shuttle grapple interfaces or trunnion pins, and thus is lifted into orbit by an expendable or reusable payload rocket. Of course, either of the PMs 14 and 16 can be designed to interface with any type of ELV, or reusable launch vehicle such as a shuttle orbiter. Additionally, the PM 14 includes an orbital debris shield 32 mounted to the back panel 22 to insure adequate protection to critical module components while the CRV is stored on orbit at the ISS.

Propulsion for the CRV can be provided by a simple monopropellant blow-down propulsion system, known in the art. The PMs 14 and 16 each include a series of engines 36 and thrusters 38 mounted in a suitable orientation to give the PMs 14 and 16 four-degrees of freedom required for deorbit maneuvers of the CRV. The engines 36 and the thrusters 38 can be any engine or thruster known in the art suitable for the mission. The actual type of engines and thrusters forms no part of the present invention. Some of the thrusters 38 can be cold gas thrusters that burn clean burning fuel such as helium or nitrogen. Cold gas thrusters would require their own separate storage tanks (not shown) mounted in a suitable location within the housing 20. In one embodiment, the PMs 14 and 16 include eight monopropellant 100 lbf engines, and eight 25 lbf attitude control system (ACS) thrusters set in an orthogonal arrangement to provide three-axis control of the PMs 14 and 16 after being separated from the space station. The propulsion system is controlled by avionics within the CRV CM in accordance with one design. The orientation of the engines 36 and the thrusters 38 can vary from design to design in accordance with specific mission requirements.

The interface ring 24 includes a removable forward adapter assembly 42 and a removable aft adapter assembly 44, and the PM 16 includes a removable crew module interface 46, mounted to the PM in the manner described below. The aft adapter assembly 44 is mounted to the interface ring 24 or the PM 16 when the PM 14 or the PM 16 is launched on an ELV. The aft adapter assembly 44 is not used when the PM 14 or the PM 16 is launched on a shuttle orbiter. The assemblies 42 and 44 and the interface 46 can be made removable by bolts or the like. The forward adapter assembly 42 and the crew module interface 46 are an interconnection of structural beams, and the aft adapter assembly 44 is a cylindrical ring mounted around the entire perimeter of the aft side of the interface ring 24. The CM (not shown) would be mounted to the forward adapter assembly 42 and the module interface 46 to complete the CRV. The aft adapter assembly 44 can be mounted to other modules similar to the propulsion modules 14 and 16 for reasons that will become apparent from the discussion below.

A structural layout within the housing 20 provides a structural configuration for mounting and arranging the various components of the PMs 14 and 16 for the evolvable concept, according to the invention. Particularly, the PMs 14 and 16 include an "eggcrate" structural assembly 50 including a first pair of walls 52 and 54 extending in one direction and a second pair of parallel walls 56 and 58 extending in an orthogonal direction and intersecting the walls 52 and 54, as shown. In one design, the depth of the walls 52–58 is substantially the same as the length of the housing 20. The intersection of the walls 52–58 define an alternating sequence of rectangular-shaped compartments 60, 62, 64 and 66 and wedged shaped compartments 68, 70, 72 and 74 around a perimeter inside of the housing 20, and surrounding an internal rectangular-shaped compartment 76. In one embodiment, the square compartments 60–66 and 76 are about 48–52 inches square. This arrangement of the compartments 60–76 forms a "cross" of five relatively square shaped compartments of substantially the same dimension. This configuration of the assembly 50 provides structural integrity to the PMs 14 and 16, and compartmentalizes the PMs 14 and 16 to increase the evolving capability, as will be apparent from the discussion below.

The walls 52–58 are shown symmetrically disposed within the housing 20, where the compartments 60–66 and 76 are substantially the same size and the compartments 68–74 are substantially the same size. However, as will be appreciated by those skilled in the art, variations of this concept can be provided. The positioning of the walls 52–56 can be varied such that the compartments have different sizes for a particular design. The walls 52–58 can be angled relative to each other to provide trapezoidal shaped compartments or other geometric shapes. Also, additional walls can be added to provide additional compartments if desired. In most spacecraft designs, the center compartment 76 will be important to the layout of the various spacecraft components.

The configuration of the walls 52–58 provides four inner mounting locations 80–86 where the walls 52–58 interconnect, and eight outer mounting locations 88–102 where the walls 52–58 and the housing 20 interconnect. The mounting locations are provided on both the fore and aft ends of the PMs 14 and 16. The crew interface module 46 is shown mounted to the four inner mounting locations 80–86 of the PM 16. The module adapter 46 is also mounted to a brace wall 104 extending between the walls 52 and 54 within the compartment 66, and a brace wall 106 mounted between the walls 52 and 54 within the compartment 62. The mounting locations 80–102 give the evolvable PM of the invention significant versatility for many different adapter designs for connecting various CMs, multiple PMs, logistics modules, or any other suitable spacecraft module that have different sized footprint and weight requirements, as will be appreciated by those skilled in the art.

In one embodiment, the walls 52–58 are secured to the end panel 22, an inside surface of the wall 20, and the front panel by any suitable mounting technique known to those skilled in the art. The walls 52–58 can be bolted, glued, welded, etc. at the desirable mounting locations in accordance with any suitable design and the materials being used. The walls 52–58 can have any thickness for the desired structural integrity, and in one embodiment the walls 52–58 are double aluminum walls. Other materials are also available for the walls 52–58, such as graphite. Of course, the wall thicknesses, compartment sizes and wall materials can be modified and varied from mission design to mission design as will be appreciated by those skilled in the art.

The compartments 60–76 provide areas for configuring and mounting the various components needed for a particular space vehicle or mission. Because the PMs 14 and 16 are only used for deorbit purposes to bring a CRV back to Earth from orbit, the PMs 14 and 16 typically will have the most basic design requirements, and the fewest components. The size of the PMs 14 and 16 are intentionally made larger than is required for deorbit purposes of the CRV in order to accommodate additional components that may be required for more complex missions.

For a CRV design, the navigation, guidance and control avionics required to control the CRV and the propulsion system of the PMs 14 and 16 would typically be housed within the CM. A series of three standard Tracking Data Relay Satellite (TDRS) propellant tanks 110 are positioned in-line in the compartments 60, 76 and 64, as shown, and hold the fuel, such as hydrazine ($N_2H_4$), for the engines 36 and the thrusters 38. The propellant tanks 110 are described as TDRS tanks by way of example in that other types of propellant tanks suitable for different space missions can be used. The propellant tanks 110 are mounted within the compartments 60, 76 and 64 by a strap that extends around a middle section of each tank 110 and is connected to the walls within the compartments, in one embodiment. Of course, the tanks 110 could be mounted in compartments 62, 66 and 76. The in-line configuration of the propellant tanks 110 offers a design improvement over traditional tank positioning in known spacecraft propulsion stages that provides better weight distribution, more room, and better control of propellant depletion from each tank on a more even basis. Known designs typically arrange the propellant tanks around a common center point where there are slight differences in the actual pressures on each line from each tank that causes the tanks not to deplete evenly. The in-line configuration as shown, allows greater control of propellant depletion during actual spacecraft flight due to the increased symmetry of the propellant lines, which results in lower pressure differences in each propellant line.

A series of battery modules 112 are mounted to the end panel 22 within the compartments 62, 66 and 70, as shown. The battery modules 112 include lithium batteries in one example. As mentioned above, typically the avionics for propulsion and space vehicle control are mounted within the CM of a CRV. However, depending on the particular design, some of the avionics may be included within the battery modules 112, or some of the modules 112 may be purely avionics modules. The structural design of the PMs 14 and 16 provide flexibility for many different vehicle designs. The battery modules 112 provide power for the on-orbit portion of the CRV mission after separation from the space station and prior to separation of the CM from the PMs 14 and 16. The batteries may need to be heated while the CRV is connected to the space station, thus requiring additional space station power. In the configuration shown, the battery modules 112 are more centrally located for thermo-isolation, thus reducing the need to be heated during storage at the space station. The battery modules 112 are set well inside the PM structure to provide micrometeroid and orbital debris protection for a three year mission life on the ISS. Thus, the wedge-shaped compartments 68, 74 and 72, are available for other components for other missions as will be discussed below. Of course, the arrangement of the battery modules 112 and the tanks 110 within the compartments can vary for different designs of other PMs within the scope of the present invention.

The structural layout of the PM 16, including the orientation of the propellant tanks 110 and the battery modules 112, is by way of example. The PM 16 can be used for many types of space missions. For example, assume that a space platform is needed to conduct a series of science experiments. The PM 16 can be carried into space by the shuttle orbiter and then released to perform experiments. If the science mission is short enough, a single tank 110 may be enough to move the PM 16 away from the shuttle by the engines 36 and thrusters 38. The tank may be located in the center compartment 76, and the science equipment can be mounted in the other compartments 60–74. If additional maneuvering of the PM 16 is involved, two propellant tanks 110 may be required, and they can be mounted in, for example, compartments 60 and 64. The center compartment 76 can be left open for scientific equipment, such as a long telescope. In this example, the PM 16 would be a free flying module without the need for any additional attached modules, and thus the adapter 46 can be eliminated and the control avionics provided in the CRV CM would be moved to the PM 16.

FIG. 5 shows a more detailed depiction of the internal components of the PM 14. In this application, each of the compartments 68, 70, 72 and 74 include a main engine module 45 as part of the main engines 36, and a thruster module 47 as part of the thrusters 38. Additionally, the compartments 62 and 66 include propellant distribution modules 49 on an internal wall adjacent the center compartment 76 to provide suitable distribution of the propellant within the tanks 110 to the main engine modules 45 and the thruster modules 47. The compartments 62 and 66 include ordnance control units 51 to control the firing of the pyro-isolation valves in the propulsion subsystem. The compartments 72 and 74 include fill and drain valve modules 53 to fill and drain the propellant tanks 110. A forward micrometeoroid and orbital debris shield 55 mounts to a front of the PM 14 and protects the propellant tanks 110 and the critical components from the space environment. The shield 55 can include a thermal shield to protect the tanks 110 and internal components from heat, or a separate thermal shield can be provided in conjunction with the orbital shield 55.

Box 116 (FIG. 1) represents a conversion of the PMs 14 or 16 to a crew transport vehicle (CTV) PM represented at box 118. In one design, the evolution to the CTV includes an upgrade of the propellant system to a bipropellant dual mode system, the addition of ACS thrusters for providing two-fault tolerance, six degrees of freedom and thruster redundancy, and the addition of extra batteries and environmental control and life support systems (ECLSS) tanks, such as oxygen and water tanks. The CTV also includes a CM attached to the PM, but includes variations from the CM used in the CRV for the different mission, as would be understood to those skilled in the art. The guidance, navigation and control (GNC) avionics and rendezvous avionics would typically reside within the CTV CM. Since the PM structure is already designed to accommodate the additional components required for the CTV, evolution is a matter of installing the necessary support hardware, harnesses, heaters, etc. The PM 16 is already designed to handle the anticipated launch loads for a CTV so there is no need to modify the primary structure.

Figure 8:
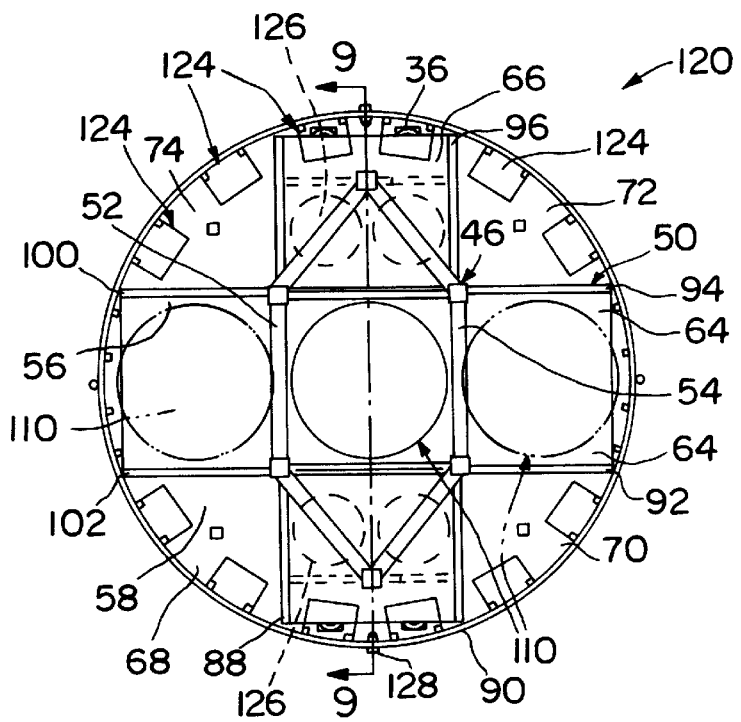
FIG. 8 is a front plan view of a propulsion module evolved from the propulsion module shown in FIG. 6 modified for use in conjunction with a CTV, according to an embodiment of the present invention.
Figure 9:
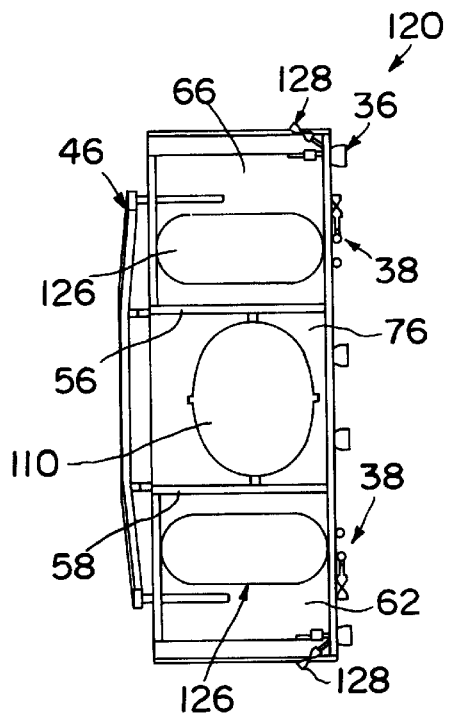
FIG. 9 is a cross-sectional view of the propulsion module shown in FIG. 8 through line 9—9.

FIG. 8 shows a plan view and FIG. 9 shows a cross-sectional view through line 9—9 of a CTV PM 120 that has been evolved from the CRV PM 16. The battery modules 112 have been replaced with a series of avionics modules 124 that are mounted on an inside surface of the housing 20 within the wedge compartments 68–74 and the square compartments 62 and 66, as shown. The avionics modules 124 are "smart" boxes that may include various electronics for docking control and sensors, computer control, electronics for guidance control, navigation control, rendezvous control, communication systems, propulsion control and batteries that are not in the CM. The requirements for a particular mission will depend on what can be carried on board the CM. Therefore, the specifics of what is included in the avionics modules 124 will be mission specific. For a typical CTV mission, most of the electronics and avionics for most of the mission requirements would be in the CTV CM, and the avionics for the propulsion system may be in the PM 120. Additionally, ECLSS tanks 126 are mounted within the compartments 62 and 66, as shown. The ECLSS tanks 126 are shown mounted within the compartments 62 and 66 at a more central location relative to the housing 20 because this design provides better thermo-isolation for the tanks 126. The tanks 126 are mounted to the end panel 22 and the opposite end panel at the ends of the tanks 26. Because the CTV mission is longer than the CRV mission, the batteries within the avionics modules 124 are mounted on the housing 20 to provide the necessary heat dissipation not required in a CRV mission.

The propulsion tanks 110 are maintained in the compartments 60, 76 and 64 for the CTV PM 120 in this design. However, the propulsion system may require upgrading for the CTV PM 120. As is well understood in the art, propulsion systems exist that burn a single propellant, such as hydrazine ($N_2H_4$), in both the engines 36 and the thrusters 38, propellant systems that use a bi-propellant such as hydrazine (MMH) and nitrogen tetroxide (NTO) for both the engines 36 and the thrusters 38, and dual mode propellant systems that use the monopropellant ($N_2H_4$) for the thrusters 38 and the bi-propellant ($N_2H_4$/NTO) for the engines 36. The bi-propellant systems provide greater fuel efficiency, but are more complex. Dual mode systems are more fuel efficient than monopropellant systems, but less complex than bi-propellant systems. Therefore, the type of mission and the cost versus benefits savings, would determine the type of propulsion system used in a particular design. Preliminary analysis has shown that if the propulsion system in the CTV is upgraded to a pressure regulated dual mode system, with bipropellant main engines and monopropellant ACS thrusters, the three standard tanks 110 would hold enough propellant to complete the up and down legs of the CTV mission. One tank 110 would need to be modified and delta-qualified with a propellant management device (PMD) to hold the oxidizer for the bipropellant engines. If it is determined that more propellant capacity is required, the structure assembly 50 has room to increase the size of the tanks 110. The structural layout of the PM 16 allows for a propulsion design of any of a monopropellant system, a dual mode bipropellant and monopropellant system, or a full bi-propellant system.

Upgrading to a dual mode system rather than a full bi-propellant system allows use of the same monopropellant ACS 25 lbf thrusters 38 as for the PM 16, thus maintaining commonality. Additional ACS thrusters 128 are added to provide two-fault tolerance and a full six degrees of freedom (6-DOF) to allow the CTV to rendezvous and dock or berth with the ISS. As an alternative, it may be cost effective to use the cold-gas thrusters 38 already in the CTV PM 120 in conjunction with identical cold-gas thrusters installed in the PM 16. The CM could control the cold-gas thrusters with the same avionics used to control the CM thrusters. Using an integrated cold-gas system for the ISS proximity maneuvering would provide an additional benefit in that it is far less contaminating to the ISS environment than bipropellant systems.

Figure 10:
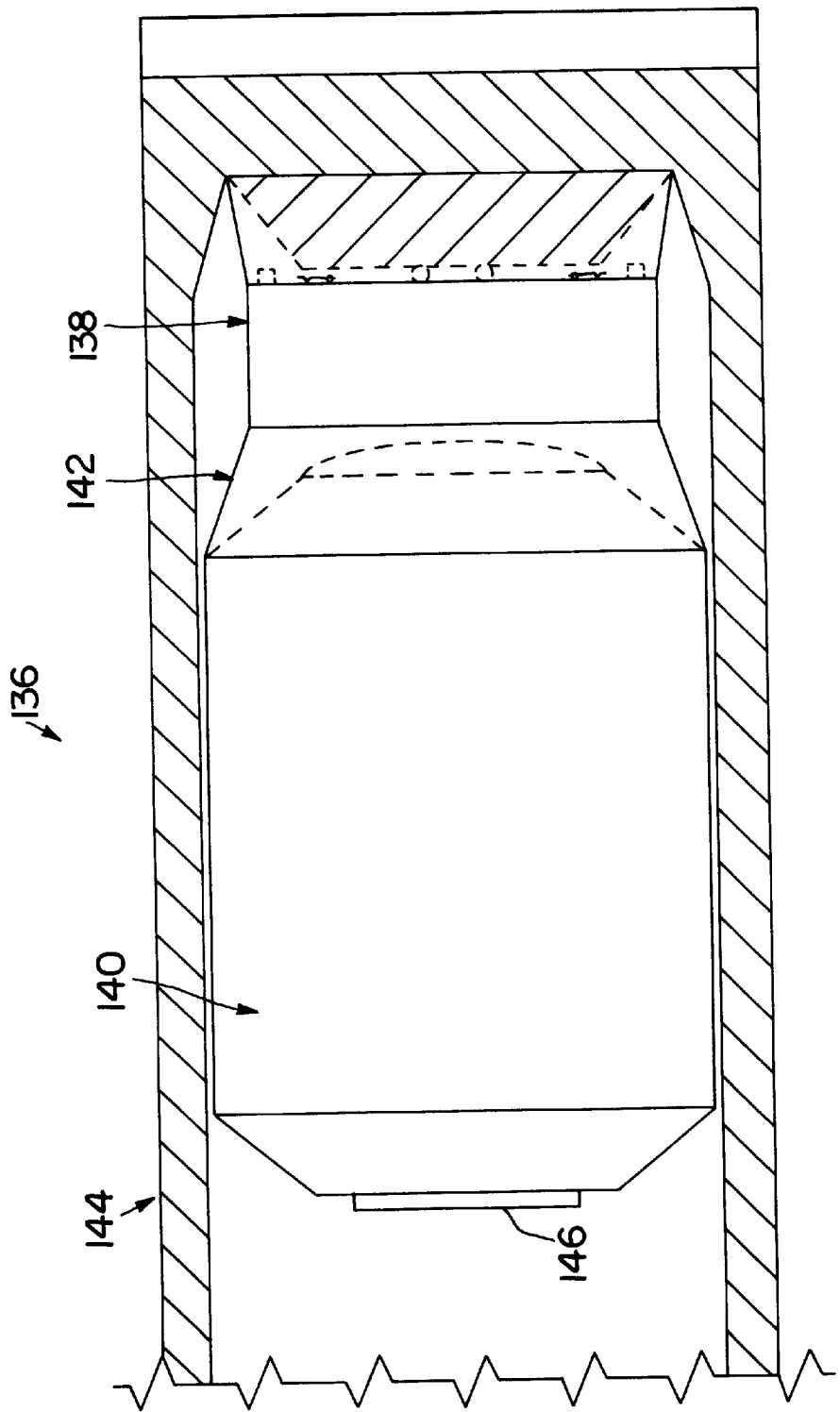
FIG. 10 is a partial cross-sectional view of a propulsion module of the type shown in FIG. 8 modified for and mounted to a logistics resupply module, according to an embodiment of the present invention.

If the known avionics developed for GNC, communications systems, and rendezvous and docking functions typically housed within the CTV CM are integrated into the CTV PM 120, which has already been upgraded to the 6-DOF CTV configuration, the result is essentially a complete, free-flying spacecraft capable of unmanned delivery of logistics cargo to the ISS. This evolution is represented at box 132 to provide a logistics resupply vehicle (LRV) represented at box 134. FIG. 10 shows an LRV 136 including an LRV PM 138 mounted to a miniature pressurized logistics module (MPLM) 140 by a conical adapter 142, all positioned within the payload fairing 144 of an Ariane rocket or some other ELV. The MPLM 140 would be suitable for holding various cargo and other payload for a typical resupply mission, and can take on various designs. In the modification from the PM 120 to the LRV PM 138, most of the electronics and avionics modules mounted within the CTV CM would be moved to the PM 138, and would be oriented within the compartments 60–76 as would be suitable for a particular logistics resupply mission. The adapter 142 would include appropriate structural mounting members to be mounted to the outer mounting locations 88–102 on the PM 138. Depending on how the LRV 136 gets to the space station, would depend on whether the full six degrees of freedom is necessary, and the orientation of the thrusters 38. Because the LRV mission is unmanned, most or all of the ECLSS tanks may not be necessary. The MPLM 140 includes an interface 146 that allows the LRV 136 to dock with the space station. By moving all or most of the guidance, navigation, rendezvous, communication, etc. avionics into the PM 138, the PM 138 basically turns into an independent free-flying space vehicle having six degrees of freedom with rendezvous and docking capabilities.

In order to avoid modification of the PM structure, the loads imparted by the cargo would need to fall within the design limits of the existing PM interface. The LRV 136 could be launched on the same launch vehicles as the CTV using the same interfaces. The rendezvous and docking sensors from the CM would be mounted at the forward end of the logistics module.

As described in the CTV conversion, if the PM 120 uses its own ACS thrusters 38 to provide 6-DOF maneuvering capability, then no additional modifications to the propulsion system are required for the LRV 136. If the CTV CM cold-gas thrusters are used in the PM 138, then cold-gas thruster packs must be added to the forward end of the MPLM 140 to complete the 6-DOF system. Since the PM 138 is already designed to remain at the ISS for extended periods, the PM 138 could remain attached to the MPLM 140 while at the ISS and then separate the MPLM 140 from the station and dispose of it in the atmosphere after its mission is complete.

Figure 11:
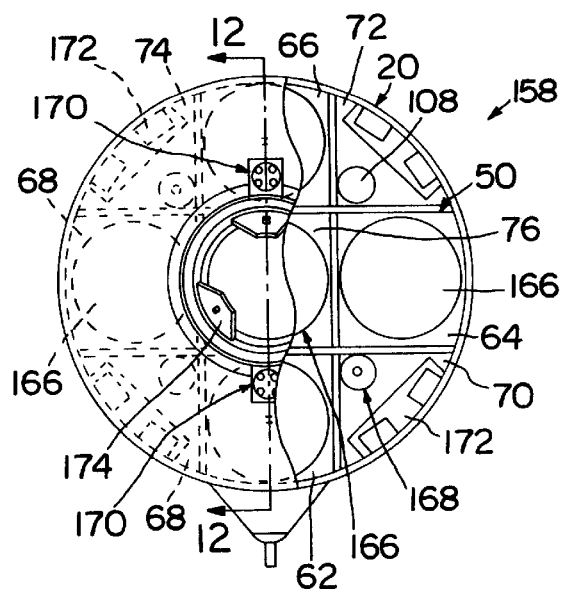
FIG. 11 is a partially broken-away front plan view of a refueling tanker including a propulsion module of the type shown in FIG. 8 mounted to a refueling module according to an embodiment of the present invention.
Figure 12:
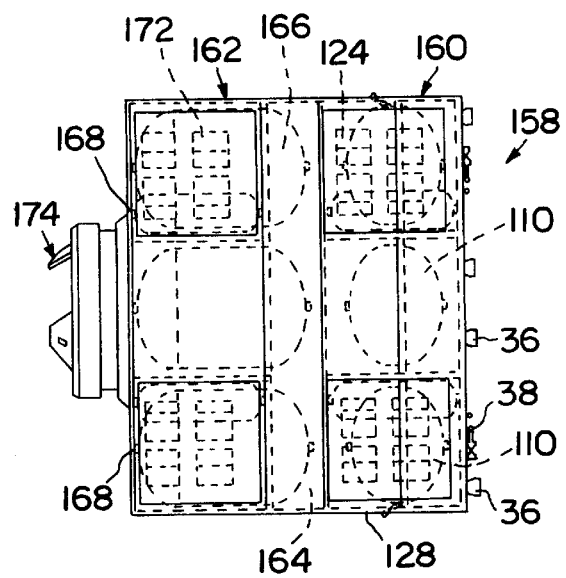
FIG. 12 is a cross-sectional view of the refueling tanker shown in FIG. 11 through line 12—12.
Figure 13:
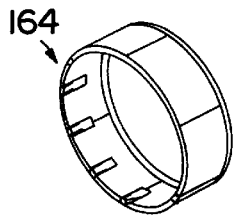
FIG. 13 is a perspective view of a ring adapter used to connect the propulsion module to the refueling module in FIGS. 11 and 12.

Refueling capability for the ISS may be accomplished by taking the PM 138 as modified for the logistics resupply mission and replacing the MPLM 140 with a refueling module complete with large propellant tanks, fluid couplings and a docking interface. Evolving to a refueling module is represented at box 150 and the corresponding refueling tanker is represented at box 152 in the flow chart diagram 10. FIG. 11 shows a front plan view of a refueling tanker 158 and FIG. 12 shows a cross-sectional view of the refueling tanker 158 through line 12—12. The refueling tanker 158 includes a refueling tanker PM 160 as the modified PM 138 attached to a refueling module 162 by a ring adapter 164, shown in perspective view in FIG. 13. The combined two module design demonstrated by the refueling tanker can be incorporated into other space vehicles, such as the CTV. Because the avionics modules 124 within the refueling tanker PM 160 provide the necessary target acquisition, guidance, rendezvous, communications, etc., the tanker PM 160 is a free flyer that does not need a corresponding CM for docking with the ISS.

The refueling module 162 includes the same internal structural layout as the PM 16. However, each of the rectangular compartments 60–66 would include a large refueling tank 166 for refueling purposes. The back panel 22 of the refueling model 162 would include openings to allow the larger tanks 166 to extend into the adapter 164. Pressurant tanks 168 are provided on an inside corner in each of the wedge shaped compartments 68–74, and are plumbed to the tanks 166 to force the fuel in the tanks 166 into tanks (not shown) being refueled, such as on the space station. Refueling couplings 170 are provided to couple the tanks 166 to the tanks being refueled. Control electronics 172 are mounted to the inside surface of the wall 20 in each of the wedge shaped compartments 68–74, as shown, to operate the refueling system and the docking functions. The electronics are hard mounted or configured as orbital replacement units (ORUs) in different embodiments. An androgynous peripheral attachment system (APAS) docking interface 174 is mounted to the inner mounting locations 80–86 of the module 162 to dock the refueling tanker 158 to the space station. According to the invention, the tanks 110 within the PM 160 that propel the tanker 158 are separately plumbed from the tanks 166 so that different fuel types can be stored in the tanks 110 and 166 if desired. The refueling module tank plumbing could be separate from the PM propulsion system so that the tanker 158 can deliver unsymmetrical dimethyl hydrazine (UDMH) and NTO in the case of refueling a Russian bi-propellant propulsion system such as a Russian functional cargo block (FGB). As shown, the PM 160 includes engines 36 and thrusters 38 to allow the tanker 158 to be a free flyer and to be lifted into space by an ELV. Of course, the refueling module 162 does not need engines and thrusters. The existing PM dual mode propulsion system would provide the impulse to deliver the refueling module to the ISS and deorbit the tanker 158 after the mission is complete.

Figure 14:
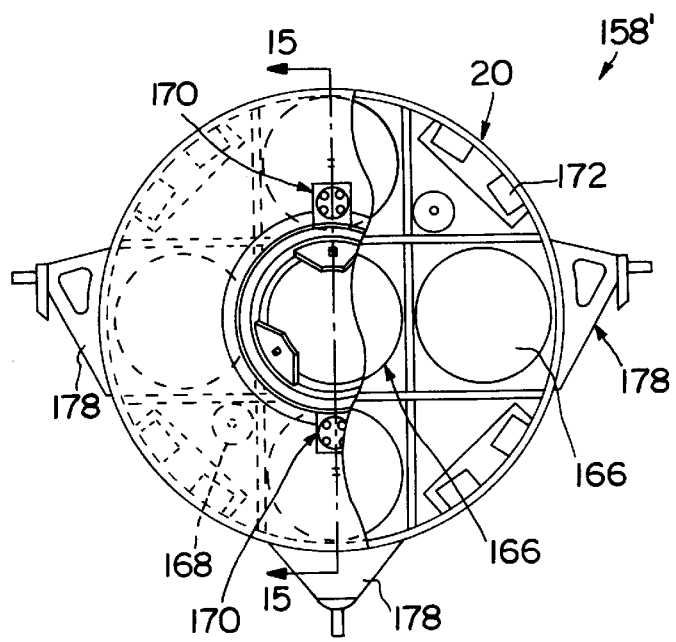
FIG. 14 is a partially broken-away front plan view showing a variation of the refueling tanker shown in FIG. 11, according to an embodiment of the present invention.
Figure 15:
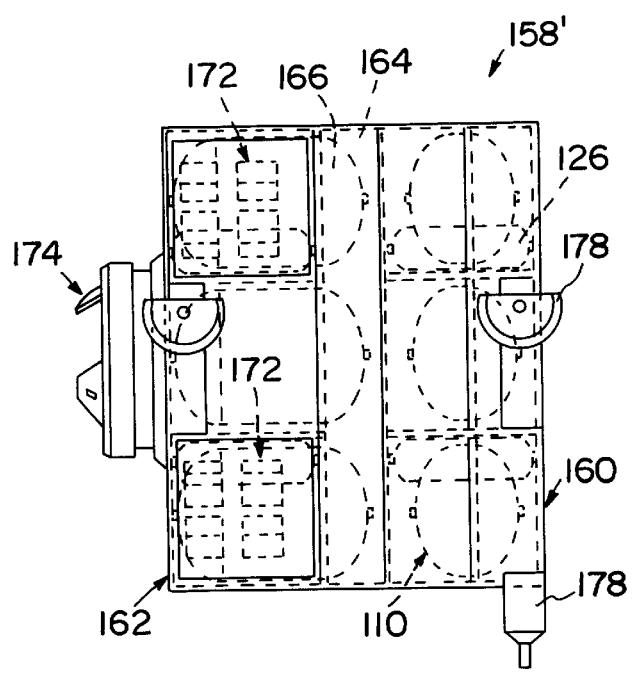
FIG. 15 is a cross-sectional view of the refueling tanker shown in FIG. 14 taken through line 15—15.

FIG. 14 shows a broken-away plan view and FIG. 15 shows a cross-sectional view through line 15—15 of a refueling tanker 158' that is a slight modification of the refueling tanker 158. The refueling tanker 158 is a free flyer in that it has engines 36 and thrusters 38, and suitable propulsion control avionics, to maneuver to the space station and be docked when launched from an ELV. Alternately, the thrusters 38 and engines 36 can be removed on the refueling tanker 158' and be lifted to the space station by the shuttle orbiter. The outer surface of the housing 20 includes a series of trunnion fittings 178 for mounting the tanker 158' within the space shuttle orbiter.

Plans for the ISS currently intend to use the Russian Progress vehicle to bring fuel and cargo to the ISS, as well as provide space station reboost. Should the need arise during the mission lifetime of the ISS to replace or supplement the Progress vehicle with a different vehicle, the building block capabilities developed for the LRV 136 and the refueling tanker 158 could be combined to create this successor or supplementary vehicle to the Progress vehicle. This vehicle would mimic Progress-ISS interfaces such that the switch from the Progress vehicle to a successor would be transparent to the ISS. This evolution in space vehicle is depicted at box 184 in FIG. 1. A combination module carrying fuel and cargo could be attached to a PM having six DOF. The module would consist of a cargo section at the forward end which would be fitted with a docking interface identical to that which was used on the Progress vehicle. A refueling tanker section would be at the aft end attached directly to the PM interface. Fuel would be transferred from the tanker section to the ISS through the cargo section via the standard refueling couplings on the docking interface. The PM propulsion system could provide ISS orbital reboost and then discard itself in the atmosphere along with the combination module after the mission was completed.

A Russian Service Module is presently planned as a module for providing control of the ISS and crew habitation. In the event that the Service Module is not available, an interim control module (ICM) may be used by the ISS during assembly for attitude and reboost adjustment. The refueling module 162 can be attached to a 6 DOF PM for providing this control until the Service Module is available. This step of evolvement is shown as box 186 in FIG. 1. In this iteration, the refueling module 162 developed for the refueling tanker 158 can be plumbed into the PM propulsion system so that the ICM PM can use all of its propellant for ISS reboost and attitude control.

The structure of the refueling tanker 158 can be further evolved to a long term propulsion module for use with the ISS that provides refueling, crew transfer, cargo transfer, reboost and attitude adjustment, etc. By removing the center tanks from the refueling tanker 158, and inserting a crew tunnel through the center of the tanker 158, such a propulsion module can be generated. This evolution is shown in FIG. 1 as adding a crew tunnel in box 188, and providing the long-term propulsion module as represented by Box 190.

Figure 16:
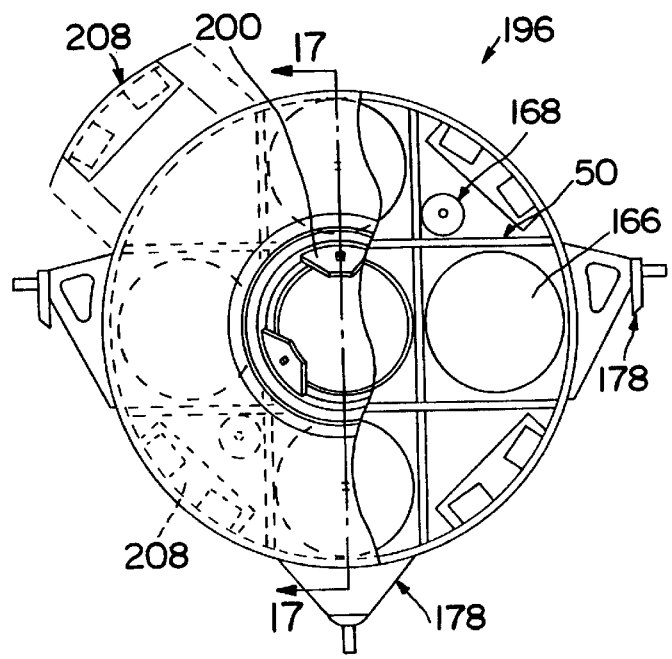
FIG. 16 is a broken-away front plan view of long-term propulsion module including a crew tunnel extending through a center compartment of the module, according to an embodiment of the present invention.
Figure 17:
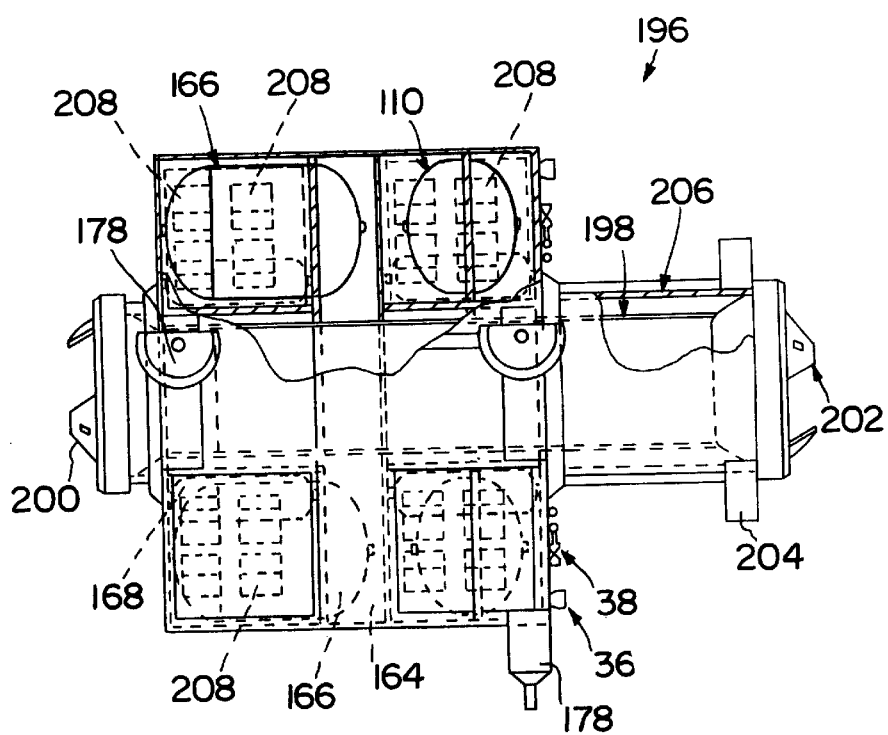
FIG. 17 is a cross-sectional view of the long-term propulsion module shown in FIG. 16 through line 17—17.

FIG. 16 shows a broken-away plan view and FIG. 17 shows a cross-sectional view taken through line 17—17 of a long-term PM 196 also representing this evolution. The long-term PM 196 has been evolved from the refueling tanker 158, where the tanks 110 and 166 in the center compartment 76 in both the refueling module 162 and the refueling PM 160 have been removed, and a crew tunnel 198 is mounted through the center of the PM 196. The presently anticipated dimensions of the center compartment 76 would allow a 42 inch diameter crew tunnel to be used. Of course, the dimensions of the compartments 60–76 would vary depending on the diameter of the housing 20. For the long-term PM 196, the pressurized crew tunnel 198 is needed to allow crew members to access another vehicle from the ISS that is docked to the PM 196. A portion of the crew tunnel 198 protrudes from the aft end of the PM to accommodate the shuttle orbiter. An APAS interface 200 is secured to the fore end of the crew tunnel 198 and an APAS interface 202 is secured to the aft end of the crew tunnel 198 for docking purposes. The entire length of the crew tunnel 198 including interfaces 200 and 202 would be about 220 inches in one embodiment. A refueling coupling 204 is secured to an outer debris shield 206 adjacent the aft APAS interface 202. The avionics and electronics are packaged into eight modules 208, where one module 208 is an ORU mounted on the outside of the housing 20. The tanks 110 can be replaced with other types of propulsion tanks.

Figure 18:
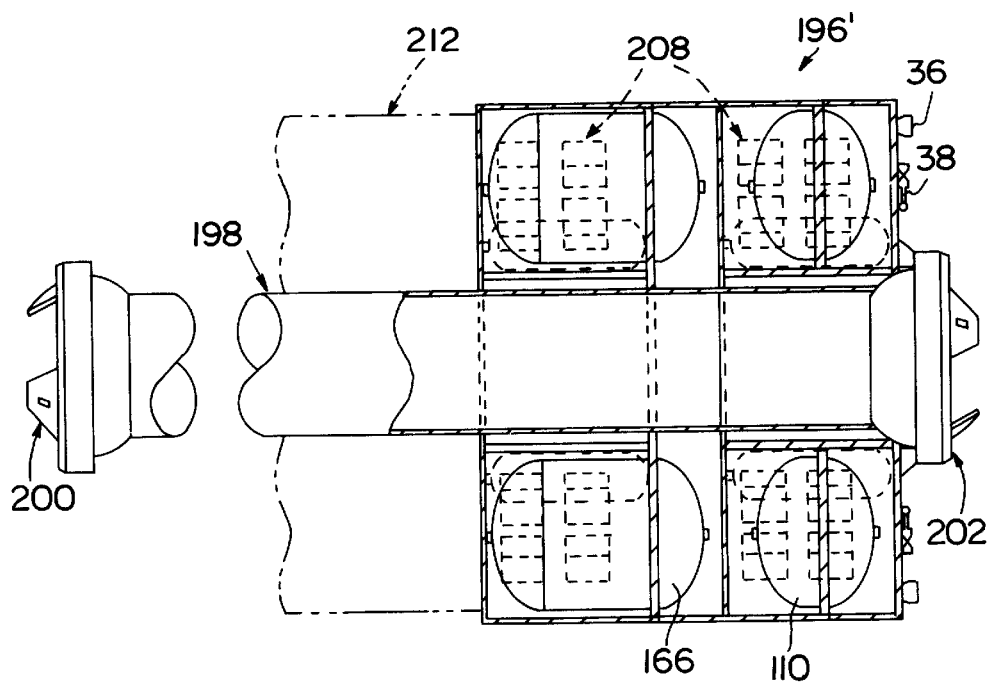
FIG. 18 is a variation of the long-term propulsion module shown in FIG. 16, according to another embodiment of the present invention.

FIG. 18 shows a variation of the long-term propulsion module 196 as PM 196'. In this variation the crew tunnel 198 extends from the fore end of the PM 196'. Additional volume 212 adjacent the fore end of the PM 196' can be provided for external mounting of solar arrays, radiators, etc. as would be understood to those skilled in the art. The PMs 196 and 196' are long-term modules in that their initial intent is to be brought to the ISS either as free flyers or on the shuttle orbiter and docked to the space station by the suitable interface 200 or 202. The PM 196' remains in this position for some extended period of time, and can provide space station reboost and attitude control, and refueling from the tanks 166 to tanks on the space station. The crew tunnel 198 provides a pressurized corridor between the space station and a later docked space vehicle, such as a refueling tanker, the Shuttle Orbiter, the Russian Progress vehicle, or any other suitable space station element to the interface 200 or 202 opposite to that docked to the ISS. If a refueling tanker is docked to the PM 196', the PM 196' provides the capability of transferring fuel through the PM 196' to the space station. Because the PM 196' is intended to remain at the space station for some period of time to provide space station reboost and attitude control, it will eventually run out of fuel and will need to be refueled. So, the PM 196' is versatile in that it provides refueling and space station reboost and attitude control, but also allows the transfer of fuel and the transfer of crew and cargo through the crew tunnel 198. Depending on its particular length of time at the space station and intended missions, suitable avionics and the like can be mounted therein. Additionally, ORUs can be used to be externally replaced by other modules if desired.

Figure 19:
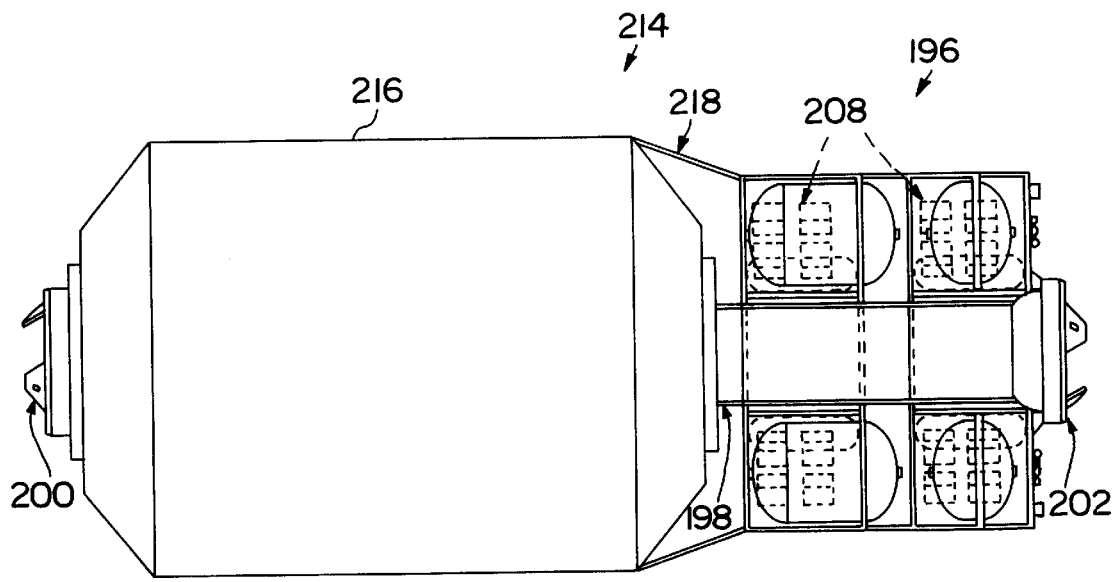
FIG. 19 is a variation of the long-term propulsion module shown in FIG. 16 including a crew habitation module according to an embodiment of the present invention.

The long-term PM 196' can be further modified to include a crew habitation module. FIG. 19 shows a space vehicle 214 including the PM 196' attached to a crew habitation module 216 by a conical shaped ring adapter 218 similar to the adapter 142. The length of the crew tunnel 198 is extended to accommodate the extended length of the crew habitation module 216. The total length of the space vehicle 214 is 421.3 inches in one embodiment.

With forward planning, the PM 16 can become a basic building block upon which additional capabilities can be added to satisfy a variety of mission requirements. Although each block can be built incrementally to achieve enhanced capabilities, the blocks can also be developed early and then used for later applications as required. The description above gives variations of the evolving capability of the basic PM 16. It is stressed, however, that these variations are no way inclusive in that all variations of various spacecraft components can be combined within the scope of the present invention.

The foregoing discussion discloses and describes merely exemplary embodiments of the present invention. One skilled in the art will readily recognize from such discussion, and from the accompanying drawings and claims, that various changes, modifications and variations to be made therein without departing from the spirit and scope of the invention as defined in the following claims.

What is claimed is:

1. A method of designing a spacecraft where the design evolves to different spacecraft having different intended space mission types, said method comprising the steps of:

designing a first evolution spacecraft for one spacecraft mission, said first evolution spacecraft being a deorbit propulsion module, said step of designing a first spacecraft including the steps of:

designing a first outer spacecraft housing, said first spacecraft housing including a housing cylinder and a housing end wall;

designing an internal support structure within the first spacecraft housing, said internal support structure including a plurality of inner compartment wall members defining a plurality of compartments; and designing the orientation of a plurality of spacecraft components within the compartments in the first spacecraft housing, said step of designing the orientation of spacecraft components including the steps of establishing the position of at least one propellant tank within at least one of the compartments in the spacecraft housing and establishing the position of at least one avionics module within one of the compartments in the spacecraft housing; and designing a second evolution spacecraft based on the first evolution spacecraft for another spacecraft mission, said second evolution spacecraft being a crew transfer vehicle, said step of designing a second evolution spacecraft including using the internal support structure and including redesigning the orientation of spacecraft components by adding, exchanging and/or repositioning spacecraft components, wherein the other spacecraft mission is a different mission type and requires significant design differences and mission goals than the one spacecraft mission.

2. The method according to claim 1 wherein the step of designing an internal support structure includes the steps of designing the plurality of inner wall members mounted within the first outer spacecraft housing, said plurality of inner wall members including first and second wall members extending in a first direction and third and fourth wall members extending in a second direction so that both of the third and fourth wall members intersect with both of the first and second wall members to define the plurality of compartments.

3. The method according to claim 2 wherein the step of designing an internal support structure further includes the steps of defining five rectangular compartments in a cross configuration having substantially the same size and four wedge-shaped compartments having substantially the same size, one of the rectangular compartments being a center compartment.

4. The method according to claim 1 wherein the step of designing an internal support structure includes designing a plurality of inner mounting locations defined by intersection points between the plurality of compartment wall members and a plurality of outer mounting locations defined by intersection points between the plurality of compartment wall members in the housing cylinder.

5. The method according to claim 4 wherein the step of designing the orientation of a plurality of spacecraft components includes designing a removable modular interface member to be mounted to the inner mounting locations.

6. The method according to claim 4 wherein the step of designing the orientation of a plurality of spacecraft components includes the step of designing an interface ring member connected to the outer mounting locations.

7. The method according to claim 1 wherein the step of designing the orientation of the plurality of spacecraft components includes the steps of establishing the orientation of a plurality of spacecraft engines and spacecraft thrusters on the housing end wall to give the first spacecraft at least four degrees of freedom of movement.

8. The method according to claim 1 wherein the steps of establishing the position of at least one propellant tank and at least one avionics module includes establishing the position of a plurality of propulsion tanks in a plurality of the compartments and establishing the position of a plurality of battery avionics modules in a plurality of the compartments, where the battery modules are mounted to the end wall within the housing.

9. The method according to claim 1 wherein the step of designing a first evolution spacecraft includes designing a propulsion module effective to be used in connection with a crew return vehicle.

10. The method according to claim 1 wherein the step of designing the second evolution spacecraft includes establishing the position of a plurality of propellant tanks within a plurality of the compartments, establishing the position of a plurality of avionics modules within a plurality of the compartments mounted to the housing cylinder within the housing and establishing the position of a plurality of oxygen and water tanks within a plurality of the compartments.

11. The method according to claim 1 further comprising the step of designing a third evolution spacecraft based on the second evolution spacecraft for a different spacecraft mission, said step of designing a third evolution spacecraft including the steps of redesigning the orientation of spacecraft components by adding, exchanging, and/or repositioning spacecraft components.

12. The method according to claim 11 wherein the step of redesigning the orientation of spacecraft components includes adding avionics modules to provide guidance, navigation, control, communications and power to operate the third spacecraft.

13. The method according to claim 12 wherein the step of redesigning the orientation of spacecraft components includes establishing the position of propellant tanks, avionics modules, and spacecraft engines and thrusters to make the third spacecraft a free flyer.

14. The method according to claim 11 wherein the step of designing a third evolution spacecraft includes designing a propulsion module effective to be used in connection with a logistics resupply vehicle, said propulsion module being connected to a logistics module.

15. The method according to claim 11 wherein the step of designing a third evolution spacecraft includes the steps of designing a second spacecraft housing, said second spacecraft housing including a housing cylinder and a housing end wall, designing an internal support structure within the second spacecraft housing, said internal support structure defining a plurality of compartments separated by a plurality of compartment wall members, and designing the orientation of a plurality of spacecraft components within the compartments in the second spacecraft housing.

16. The method according to claim 11 further comprising the step of designing a fourth evolution spacecraft based on the third evolution spacecraft for a different spacecraft mission, said step of designing a fourth evolution spacecraft including the steps of redesigning the orientation of spacecraft components by adding, exchanging and/or repositioning spacecraft components.

17. The method according to claim 16 wherein the step of designing the orientation of a plurality of spacecraft components includes positioning a crew tunnel extending through one of the compartments, said crew tunnel including a first docking interface at one end of the crew tunnel and a second docking interface at another end of the crew tunnel.

18. The method according to claim 16 wherein the step of designing a fourth spacecraft includes designing a long-term propulsion module.

19. The method according to claim 1 wherein the step of redesigning the orientation of spacecraft components includes mounting a docking interface to the second spacecraft.

20. A method for designing a spacecraft where the design evolves to a more complex spacecraft having a different intended space mission types, said method comprising the steps of:

designing a first evolution spacecraft for one spacecraft mission, said first evolution spacecraft being a deorbit propulsion module, said step of designing a first spacecraft including the steps of:
designing a first spacecraft housing;
designing an internal support structure within the first spacecraft housing;
designing the orientation of a plurality of spacecraft components within the first spacecraft housing; and
designing a second evolution spacecraft based on the first evolution spacecraft for another spacecraft mission, said second spacecraft utilizing substantially the same spacecraft housing and internal support structure as the first spacecraft, said step of designing a second evolution spacecraft including redesigning the orientation of spacecraft components by adding, exchanging and/or repositioning spacecraft components within the spacecraft housing to make a spacecraft selected from the group consisting of a crew transfer vehicle, a free flyer, a logistics resupply vehicle and a refueling tanker, wherein the other spacecraft mission is a different mission type and requires significant design differences and mission goals than the one spacecraft mission.

21. The method according to claim 20 wherein the step of designing an internal support structure includes the steps of designing a plurality of inner wall members mounted within the first spacecraft housing, said plurality of inner wall members including first and second wall members extending in a first direction and third and fourth wall members extending in a second direction so that both of the third and fourth wall members intersect with both of the first and second wall members to define a plurality of compartments.

22. The method according to claim 21 wherein the step of designing an internal support structure further includes the steps of defining five rectangular-shaped compartments in a cross configuration and having substantially the same size and four wedge-shaped compartments having substantially the same size, wherein one of the rectangular compartments is a center compartment.

23. The method according to claim 20 wherein the step of designing an internal support structure includes designing a plurality of inner mounting locations defined by intersection points between a plurality of wall members and a plurality of outer mounting locations defined by intersection points between the plurality of wall members and the spacecraft housing.

24. The method according to claim 23 wherein the step of designing the orientation of a plurality of spacecraft components includes designing a removable modular interface mounted to the inner mounting locations.

25. The method according to claim 24 wherein the step of designing an interface includes designing a crew module interface member mounted to the inner mounting locations for connecting a crew module to the first spacecraft mounted.

26. The method according to claim 23 wherein the step of designing the orientation and the plurality of spacecraft components includes the step of designing an interface ring member connected to the outer mounting locations at an aft end of the first spacecraft.

27. The method according to claim 20 where the step of designing a second evolution spacecraft includes the step of designing the orientation of a plurality of spacecraft components within the spacecraft housing of the second spacecraft, said step of designing the orientation of a plurality of spacecraft components including upgrading a propulsion system to a bipropellant dual mode propulsion system, adding additional batteries, adding life support system tanks, and adding thrusters.

28. The method according to claim 21 wherein the step of designing the orientation of a plurality of spacecraft components includes establishing the position of at least three propellant tanks aligned in three separate compartments.

29. The method according to claim 20 wherein the step of designing a second evolution spacecraft includes the step of designing the orientation of a plurality of spacecraft components including adding avionics modules to the second spacecraft that provide for guidance, navigation, docking, rendezvous control and communications.

30. The method according to claim 20 wherein the step of designing a second evolution spacecraft includes the steps of designing a second spacecraft housing, designing an internal support structure within the second spacecraft housing, and designing the orientation of a plurality of spacecraft components within the second spacecraft housing.

31. The method according to claim 30 wherein the step of designing the orientation of a plurality of spacecraft components within the second spacecraft housing includes mounting a plurality of propellant storage tanks, a plurality of pressurant tanks, and at least one refueling connector within the second spacecraft housing.

32. The method according to claim 20 wherein the step of designing a second evolution spacecraft includes designing the orientation of the plurality of spacecraft components to include a crew tunnel extending through the spacecraft housing, said crew tunnel including a first docking interface at one end of the crew tunnel and a second docking interface at another end of the crew tunnel.

33. A method of evolving an original spacecraft design into subsequent spacecraft designs, said method comprising the steps of:

providing a spacecraft structure having a particular configuration, said spacecraft structure being configured to accept a plurality of spacecraft components;

mounting a plurality of spacecraft components within the spacecraft housing to define a spacecraft effective as a deorbit propulsion module; and reconfiguring the spacecraft components by removing, repositioning and/or adding additional spacecraft components within the structure configuration to define a spacecraft that uses the structure configuration and is able to provide a more complex space mission function than the deorbit propulsion module, said step of reconfiguring the spacecraft components including reconfiguring the spacecraft components in a position effective to be used for a spacecraft selected from the group consisting of a propulsion module effective for use in combination with a crew transfer vehicle, a free flying refueling tanker, and an unmanned logistics resupply vehicle.

34. The method according to claim 33 wherein the step of reconfiguring the spacecraft components includes adding avionics modules for providing guidance, navigation, communication and docking functions.

35. The method according to claim 33 wherein the step of reconfiguring the spacecraft components includes adding life support tanks and repositioning battery modules.

36. The method according to claim 33 wherein the step of reconfiguring the spacecraft components includes making a free flying refueling tanker.

* * * * *